US011203730B2

(12) United States Patent
Kurth et al.

(10) Patent No.: US 11,203,730 B2
(45) Date of Patent: Dec. 21, 2021

(54) WAX COMPOSITIONS AND DISSIPATION FACTOR (71) Applicant: CARGILL, INCORPORATED, Wayzata, MN (US)

(72) Inventors: Todd L Kurth, Maple Grove, MN (US); Timothy Alan Murphy, Albertville, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 16/607,901

(22) PCT Filed: Apr. 24, 2018

(86) PCT No.: PCT/US2018/029095
§ 371 (c)(1),
(2) Date: Oct. 24, 2019

(87) PCT Pub. No.: WO2018/200486
PCT Pub. Date: Nov. 1, 2018

(65) Prior Publication Data
US 2020/0181531 A1 Jun. 11, 2020

Related U.S. Application Data (60) Provisional application No. 62/489,169, filed on Apr. 24, 2017.

(51) Int. Cl.
*C11C 5/00* (2006.01)
*C11B 3/00* (2006.01)

(52) U.S. Cl.
CPC ............. *C11C 5/002* (2013.01); *C11B 3/00* (2013.01)

(58) Field of Classification Search
CPC ..................................................... C11C 5/002
See application file for complete search history.

(56) References Cited

U.S. PATENT DOCUMENTS

| | | | | |
|---|---|---|---|---|
| 2,365,045 A * | 12/1944 | Borkowski | ............. | C11C 3/123 554/146 |
| 2,486,469 A | 11/1949 | August | | |
| 2,602,807 A * | 7/1952 | Morris | ..................... | C11C 3/123 502/337 |
| 2,650,931 A * | 9/1953 | Dron | .......................... | C11C 3/12 554/176 |
| 2,654,766 A * | 10/1953 | Ilona | ........................ | C11B 3/001 554/147 |
| 2,783,260 A * | 2/1957 | Merker | ................... | C11B 3/001 554/190 |
| 3,252,893 A | 5/1966 | Mills | | |
| 3,367,758 A | 2/1968 | Ambrose | | |
| 4,096,298 A * | 6/1978 | Menig | ........................ | C11C 5/02 118/101 |
| 4,526,530 A | 7/1985 | Menter | | |
| 4,857,237 A * | 8/1989 | Kopp | ...................... | C11B 3/001 554/147 |
| 4,992,618 A * | 2/1991 | Kulprathipanja | ......... | C07C 7/13 585/820 |
| 5,395,234 A | 3/1995 | Gutierrez | | |
| 6,019,804 A | 2/2000 | Matyas et al. | | |
| 6,054,517 A * | 4/2000 | Spaulding | ............... | C08L 77/06 44/275 |
| 6,063,144 A | 5/2000 | Calzada | | |
| 6,322,621 B1 * | 11/2001 | Goldman | ............. | B01D 17/047 106/270 |
| 6,503,285 B1 * | 1/2003 | Murphy | ................... | C11C 5/002 431/288 |
| 6,599,334 B1 * | 7/2003 | Anderson | ............... | C11C 5/002 431/288 |
| 6,730,137 B2 | 5/2004 | Pesu | | |
| 7,247,017 B2 | 7/2007 | Furner | | |
| 7,588,607 B1 * | 9/2009 | Cap | ......................... | C11C 5/002 431/288 |
| 7,691,664 B2 | 4/2010 | Kodas | | |
| 7,846,372 B1 * | 12/2010 | Njus | ...................... | B29C 67/241 264/330 |
| 8,137,418 B2 * | 3/2012 | Tao | ............................ | C10L 5/44 44/275 |
| 8,603,197 B2 * | 12/2013 | Lemke | .................... | C08L 91/06 44/275 |
| 8,652,221 B2 | 2/2014 | Uptain | | |
| 8,685,680 B2 | 4/2014 | Binder | | |
| 9,156,809 B2 | 10/2015 | Rieth | | |
| 9,289,460 B2 | 3/2016 | Jüsten et al. | | |
| 9,301,910 B2 | 4/2016 | Yontz | | |
| 10,435,562 B2 | 10/2019 | Berlin | | |
| 10,501,670 B2 * | 12/2019 | Hahn | ....................... | C08K 5/01 |

(Continued)

FOREIGN PATENT DOCUMENTS

CN  106978262 A  *  7/2017
WO  9749100 W  12/1997

(Continued)

OTHER PUBLICATIONS

English-Language Machine Translation of CN 106978262 (2017) (Year: 2017).*
ASTM Method D1331-14 (2014) (Year: 2014).*
ASTM method D924-08 (2015) (Year: 2015).*
Hawley's Condensed Chemical Dictionary, p. 1229 (16th ed., 2016, R.J. Larrañaga ed.) (Year: 2016).*
Dohnalova, Lucie et al., "Determination of nickel in hydrogenated fats and selected chocolates bars in Czech Republic", Food Chemistry, Elsevier Ltd, NL, vol. 217, Aug. 24, 2016, pp. 456-460, XP029741685, ISSN 0308-8146, DOI: 10.1016/J.FOODCHEM. 2016.08.066.
Eliezer Ahmed Melo-Espinosa et al., "Surface tension prediction of vegetable oils using artificial neural networks and multiple linear regression", Energy Procedia, vol. 57, Jan. 1, 2014, pp. 886-895, XP055758496, NL ISSN 1876-6102, DOI: 10.1016/j.egypro.2014. 10.298.

(Continued)

*Primary Examiner* — Alexander R Pagano (57) ABSTRACT

Disclosed herein is a method of using dissipation factor to control the purification of candle wax compositions, comprising purifying a modified natural oil until a dissipation factor ranging from 0.0001-0.0600 is achieved.

14 Claims, 3 Drawing Sheets

(56) References Cited

U.S. PATENT DOCUMENTS

| | | | |
|---|---|---|---|
| 2002/0157303 A1* | 10/2002 | Murphy | C11C 5/002 44/275 |
| 2003/0013060 A1* | 1/2003 | Schoeck | F23D 3/16 431/288 |
| 2003/0017431 A1* | 1/2003 | Murphy | C11C 5/002 431/288 |
| 2003/0057599 A1* | 3/2003 | Murphy | C11C 5/002 264/237 |
| 2004/0088907 A1* | 5/2004 | Murphy | C11C 5/002 44/275 |
| 2004/0088908 A1* | 5/2004 | Murphy | C11C 5/002 44/275 |
| 2006/0113216 A1* | 6/2006 | Rosenbaum | C10M 177/00 208/27 |
| 2009/0217568 A1* | 9/2009 | Murphy | C08L 91/06 44/275 |
| 2010/0132250 A1* | 6/2010 | Uptain | C11C 5/002 44/275 |
| 2011/0045424 A1 | 2/2011 | Litten-Brown | |
| 2011/0219667 A1* | 9/2011 | DiMaio | B29C 39/003 44/275 |
| 2012/0015312 A1 | 1/2012 | Kodali | |
| 2012/0124892 A1* | 5/2012 | Murphy | C11C 5/002 44/275 |
| 2013/0071799 A1* | 3/2013 | Syed | A01H 5/10 431/291 |
| 2014/0054519 A1* | 2/2014 | Parodi | H01B 3/20 252/576 |
| 2014/0131634 A1* | 5/2014 | Sunkara | H01B 3/20 252/578 |
| 2014/0230314 A1* | 8/2014 | Murphy | C11C 5/002 44/275 |
| 2014/0309445 A1* | 10/2014 | Uptain | C11C 3/00 554/141 |
| 2014/0313670 A1* | 10/2014 | Han | H05K 7/20218 361/699 |
| 2015/0325332 A1* | 11/2015 | Aufdembrink | H01B 3/20 336/94 |
| 2016/0097019 A1* | 4/2016 | Murphy | C11C 5/023 44/275 |
| 2017/0253832 A1* | 9/2017 | Murphy | C11C 5/023 44/275 |
| 2020/0095519 A1* | 3/2020 | Kurth | C11C 5/00 |

FOREIGN PATENT DOCUMENTS

| | | | |
|---|---|---|---|
| WO | WO-2006076364 A2 * | 7/2006 | A61L 9/02 |
| WO | 2014100649 A1 | 6/2014 | |
| WO | 2014127092 A1 | 8/2014 | |
| WO | 2016154259 A1 | 9/2016 | |
| WO | 2018200763 A1 | 11/2018 | |

OTHER PUBLICATIONS

Gerrit Van Duijn, "Fate of contaminants during the refining process of vegetable oils and fats: A calculation model : Fate of contaminants during the refining process", European Journal of Lipid Science and Technology., vol. 118, No. 3, Aug. 4, 2015, pp. 353-360, XP055758514, DE ISSN: 1438-7697, DOI: 10.1002/ejlt. 201500170.

Matos Reyes M N et al., "Determination of copper and nickel in vegetable oils by direct sampling graphite furnace atomic absorption spectrometry", Talanta, Elsevier, Amsterdam, NL, vol. 70, No. 5, Dec. 15, 2006, pp. 929-932, XP025001076, ISSN: 0039-9140, DOI: 10.1016/J.TALANTA.2006.05.055.

Shreya N. Sahasrabudhe et al., "Density, viscosity, and surface tension of five vegetable oils at elevated temperatures: Measurement and modeling", International Journal of Food Properties, Dec. 29, 2017, XP055758730, US ISSN: 1094-2912, DOI: 10.1080/ 10942912.2017.1360905.

Thangaraja J. et al., "Predicting surface tension for vegetable oil and biodiesel fuels", RSC Advances, vol. 6, No. 88, Jan. 1, 2016, p. 84645-84657, XP055758498, GB ISSN: 2046-2069, DOI: 10.1039/ C6RA17948G.

* cited by examiner

WAX COMPOSITIONS AND DISSIPATION FACTOR

CROSS-REFERENCE TO RELATED APPLICATIONS

This application is a national phase application of International Application No. PCT/US2018/029095, filed Apr. 24, 2018, entitled WAX COMPOSITIONS AND DISSIPATION FACTOR, which claims the benefit of U.S. Provisional Patent Application No. 62/489,169, filed Apr. 24, 2017, entitled WAX COMPOSITIONS AND DISSIPATION FACTOR, each of which is hereby incorporated by reference in its entirety.

FIELD OF THE INVENTION

This application relates to wax compositions comprising natural oils and using dissipation factor to control the purification of the wax composition to improve candle wax properties.

BACKGROUND

Candles have been known and used for illumination since early civilization. The earliest candles are thought to have been developed by the Egyptians who soaked the pithy cores of reeds in molten tallow and to make rushlights or torches. The Romans are credited with developing the first candle which utilized a wick. The Romans also used tallow, derived from cattle or sheep suet, for candle wax. During the Middle Ages, beeswax was found to be suitable in candles. Beeswax candles were desirable over other candles because beeswax does not produce a smoky flame, or emit unpleasant odor when burned. Then, as now, beeswax candles were expensive, and prohibitively so, preventing most people from enjoying their advantages. Candles produced from molds first appeared in 15$^{th}$ century France. Over the centuries, candle technology has refined and improved.

Today, more consumers are demanding candle wax formulations based upon natural materials, and more particularly plant-based oils. However, the production of candles from these formulations sometimes demonstrate cracking, air pocket formation, product shrinkage and a natural product odor associated with vegetable materials. Various soybean-based waxes have been reported to suffer performance problems relating to optimum flame height, effective wax and wick performance matching for an even burn, soot, maximum burning time, failure to achieve a consistent appearance upon resolidification after melting, product color integration and/or product shelf life.

Accordingly, there remains opportunity to improve the aesthetic and functional properties of natural oil wax formulations.

SUMMARY

Disclosed herein is a method of using dissipation factor to control the purification of candle wax compositions, comprising purifying a modified natural oil until a dissipation factor ranging from 0.0001-0.0600 is achieved.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to natural oil wax compositions, specifically candle wax compositions and the use of dissipation factor to control the purification of the wax compositions to improve candle properties, for example rate of consumption, decrease potential interactions in formulations, and flame height, and improve consistency of said candle properties during the life of the candle.

As used herein, the singular forms "a," "an," and "the" include plural referents unless the context clearly dictates otherwise. For example, reference to "a substituent" encompasses a single substituent as well as two or more substituents, and the like.

As used herein, the terms "for example," "for instance," "such as," or "including" are meant to introduce examples that further clarify more general subject matter. Unless otherwise specified, these examples are provided only as an aid for understanding the applications illustrated in the present disclosure, and are not meant to be limiting in any fashion.

As used herein, the following terms have the following meanings unless expressly stated to the contrary. It is understood that any term in the singular may include its plural counterpart and vice versa.

As used herein, the term "natural oil" may refer to oils derived from plant or animal sources or byproducts from crude streams thereof. The term "natural oil" includes natural oil derivatives, unless otherwise indicated. Examples of plant-based oils include, but are not limited to, vegetable oils, algae oils, tall oils, derivatives of these oils, combinations of any of these oils, and the like. Representative non-limiting examples of plant-based oils include canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, hemp oil, algal oil, and castor oil. Representative non-limiting examples of animal sources include lard, tallow, poultry fat, yellow grease, and fish oil. Tall oils are by-products of wood pulp manufacture. In certain aspects, the natural oil may be refined, bleached, and/or deodorized (also known as "RBD") according to methods commonly known in the art.

As used herein, the term "natural oil derivatives" is synonymous with "modified natural oil" and refers to the compounds or mixture of compounds derived from the natural oil using any one or combination of methods known in the art. Such methods include but are not limited to saponification, transesterification, esterification, interesterification, hydrogenation (partial or full), isomerization, oxidation, polymerization, and reduction.

Wax Composition

The present wax compositions relate to waxes comprising natural oils and/or natural oil derivatives which can be used in candles. The waxes typically have a low paraffin content (less than 50%, and typically much lower amounts). The candles are typically formed from a natural oil or a natural oil derivative. Since the candles may be formed from a material with a low paraffin content and may be substantially devoid of paraffin (e.g. contain no more than about 0.5 wt. % paraffin), the candles are generally clean burning, emitting very little soot. The combination of low soot emission, biodegradability and production from renewable raw material makes the present waxes and candles particularly environmentally friendly products.

The present wax compositions are typically solid at room temperature, firm but not brittle, generally somewhat malleable, have no free oil visible and are particularly suited for use in forming many types of candles, such as container candles, votive candles, and pillar candles. The present waxes are also generally capable of providing consistent characteristics, such as appearance, upon cooling and resolidification (e.g., after being burned in a candle) of the melted wax. In addition, it is desirable that the wax composition is capable of being blended with natural color additives to provide an even, solid color distribution. It is also desirable that the wax composition is capable of being blended with other additives, such as perfumes or other fragrances, and preferably be capable of exhibiting good fragrance throw when the wax/fragrance blend is burned. It is further desirable that the wax composition is resistant to chalking and fat bloom.

Furthermore, the wax compositions of the present inventions are capable of having a dissipation factor that can be controlled, desirable burn properties (including both a desirable rate of consumption and flame height) and desirable glass adhesion properties.

In some aspects, the wax composition includes at least one of or a combination of glycerol monstearates and fatty acids. In some aspects, the wax composition includes a polyol fatty acid and/or fatty acid ester component (made up of partial and/or esterified polyols), for example triglycerides or transesterified or esterified derivatives. Very often the polyol fatty acid ester component has been subjected to an interesterification reaction, e.g., by treatment with a basic catalyst, such as a sodium alkoxide. For example the polyol ester component may include a polyol fatty acid ester component formed by a process which comprises interesterifying a polyol fatty acid ester precursor mixture. Due to their desirable melting characteristics, the polyol ester based waxes having a melting point of about 48° C. to about 75° C. can be particularly advantageous for use in forming candles. Commonly, the polyol ester based waxes include at least about 51 wt. % of a polyol fatty acid ester component (and more desirably at least about 70 wt. %). More typically, the wax includes at least about 51 wt. % of a esterified polyol ester component (e.g., a mixture of triacylglycerol compounds optionally combined with esters of other polyols), and preferably includes at least 70 wt. % of the esterified polyol. Very often, the esterified polyol ester component has been subjected to interesterification conditions. The interesterification of a mixture of polyol esters may be conducted on a mixture which also includes one or more polyol partial esters, e.g., a fatty acid monoglyceride and/or fatty acid diglyceride.

In some aspects, the wax composition includes other components such as a mineral wax, a free fatty acid, a solid natural wax (such as plant wax or insect wax), and/or other renewable resource based wax. These waxes are preferably present in the composition up to about 49 wt %, and often in much lower amounts. The mineral wax may be a petroleum wax such as a medium paraffin wax, a microcrystalline paraffin wax and/or a petroleum wax obtained from crude oil refined to other degrees. In another aspect, the wax composition includes no more than about 25 wt % of the alternate waxes. In still another aspect, the wax composition includes no more than about 10% by weight of the alternate waxes and may not contain an alternate wax at all.

In some aspects, the wax composition may include no more than about 5 to 15 wt % 16:0 fatty acids in its fatty acid profile, no more than about 10 wt % fatty acids having hydroxyl groups, and/or no more than about 25 wt % fatty acids having less than 16 carbon atoms or more than 18 carbon atoms. In other aspects, the wax composition may include at least about 51 wt % of the polyol fatty acid ester component, and preferably include at least about 51 wt % of a esterified polyol fatty acid ester component.

In some aspects, the wax composition comprises a combination of one or more of monoacylglycerols (MAGs), diacylglycerols (DAGs), and triacylglycerols (TAGs).

In some aspects, the wax composition can include between approximately 0.1-10 percent by weight TAGs, approximately 1-8 percent by weight TAGs, or approximately 2-5 percent by weight TAGs.

In some aspects, the wax composition can include between approximately 30-95 percent by weight MAGs and DAGs combined, approximately 40-80 percent by weight MAGs and DAGs combined, approximately 45-65 percent by weight MAGs and DAGs combined, or approximately 50-60 percent by weight MAGs and DAGs combined.

In some aspects, the wax composition can include between approximately 5-65 percent by weight MAGs, approximately 15-55 percent by weight MAGs, approximately 25-45 percent by weight MAGs, or approximately 30-40 percent by weight MAGs. In yet other aspects, the wax composition can include between approximately 1-50 percent by weight DAGs, approximately 5-35 percent by weight DAGs, approximately 10-30 percent by weight DAGs, or approximately 15-25 percent by weight DAGs.

In some aspects, the wax composition can include between approximately 0.1 percent by weight and approximately 65 percent by weight of a fatty acid. In another aspect, the wax composition can include between approximately 5 percent by weight and 60 percent by weight of a fatty acid. In another aspect, the wax composition can include between approximately 30 percent by weight and 50 percent by weight of a fatty acid. In yet another aspect, the wax composition can include between approximately 35 percent by weight and 45 percent by weight of a fatty acid.

In some aspects, the wax composition can include approximately 0.1-10 percent by weight TAGs; approximately 30-95 percent by weight MAGs and DAGs combined, and approximately 0.1-65 percent by weight fatty acid. In certain aspects, the wax composition comprises between 5-65 percent by weight MAGs and between 1-50 percent by weight DAGs.

In some aspects, the wax composition can include approximately 1-8 percent by weight TAGs, approximately 40-80 percent by weight MAGs and DAGs combined, and approximately 5-60 percent by weight fatty acid. In some aspects, the composition comprises between 15-55 percent by weight MAGs and between 5-35 percent by weight DAGs.

In some aspects, the wax composition has approximately 2-5 percent by weight TAGs, approximately 45-65 percent by weight MAGs and DAGs combined, and approximately 30-50 percent by weight fatty acid. In certain aspects, the wax composition comprises between 25-45 percent by weight MAGs and between 10-30 percent by weight DAGs.

In some aspects, the wax composition has approximately 2-5 percent by weight TAGs, approximately 30-40 percent by weight MAGs, approximately 15-25 percent by weight DAGs, and approximately 35-45 percent by weight fatty acid.

In some aspects, the wax composition comprises a high TAG content, wherein a majority of the wax, at least about 50 wt %, preferably at least about 75 wt %, and most preferably at least about 90 wt %, is a TAG component.

In some aspects, the wax composition comprises an at least partially hydrogenated natural oil having an Iodine Value ranging from about 45 to about 70, and more preferably from about 45 to about 55, and even more preferably from about 50 to 55, wherein Iodine Value (IV) is determined by the Wijs method (AOCS Cd 1-25).

In some aspects, the wax composition is a blend of partially hydrogenated soybean oil and fully hydrogenated palm oil, wherein the partially hydrogenated soybean oils makes up 70-90 wt % of the blend and hydrogenated palm oil makes up the remaining balance. In more preferred aspects, partially hydrogenated soybean oil makes up 80-85 wt % of the blend and hydrogenated palm oil makes up the remaining balance.

In some aspects, the wax composition primarily comprises paraffin and includes a minor amount of natural oil.

In some aspects, the wax composition has a solid fat content (measured at 10° C.) from about 80-100% (determined by AOCS Cd 16b-93) and in some aspects the solid fat content ranges from about 85-95%.

Achieving Desired Wax Composition

There are many purification steps that can be incorporated in the process of manufacturing a candle wax composition utilizing natural oil and/or natural oil derivative as the starting material source. It shall be understood that such natural oils and derivatives inherently contain impurities and certain esterification, hydrogenation, etc., reactions that take place to achieve the candle wax composition described herein incorporate additional impurities that have a significant impact on candle wax formulations. Accordingly, there is a desire to control the concentration of these impurities completely or to a consistent level to improve the overall performance of the wax composition.

Purification can be achieved through various methods commonly known in the art, for example chemical and/or physical refining, water washing, bleaching, deodorizing or filtration. As a person skilled in the art knows, each step has the objective of extracting impurities in the oil, for example but not limited to, phosphatides and solids, free fatty acids, metals ($Ca^{+2}$, $Mg^{+2}$, $Fe^{+2}$, $Cu^{+2}$, etc.), pigments, soaps, metals, steroids, nickel, pesticides and tocopherols.

Described herein is a method of purifying the wax composition of the impurities described above via the utilization of dissipation factor to achieve a wax composition desirable for candle wax compositions. It shall be understood that dissipation factor can be used to control various methods of purification (refining, water washing, bleaching, deodorizing, fractionation, etc.), either upstream or downstream processing of the wax composition. In preferred aspects described herein, dissipation factor is utilized during filtration to control purification of wax compositions for candle wax applications.

As an example, the filtration process of a wax composition can utilize a filtration media with an affinity of absorbing and/or adsorbing certain impurity components. Preferred filtration media include silica-containing compositions such as commercially available Tri-Syl 100, Tri-Syl 300, or Oil-Dri Pure-Flo Perform 6000. In other aspects, the filtration media can include commercially available Microsorb 00/90, Magnesol, and Alumina 14-28 Mesh, for example.

To improve filtering performance, a filter aid can be used. A filter aid can be added to the oil directly and/or it may be applied to the filter. Representative examples of filtering aids include inorganic substrates such as diatomaceous earth, silica, alumina, and carbon. Typically, the filtering aid is used in an amount of about 10 wt % or less, for example, about 5 wt % or less, or about 1 wt % or less of the oil.

It shall be understood that filtration can include selective filtration as certain filtration medias and filtration aids are designed to remove unique impurities. Accordingly, the design of the filtration process will depend on the natural oil material being used as they each have unique impurity profiles. Furthermore, the desired rate of consumption and/or flame height properties of the candle wax composition can also influence filtration processing and which impurities are most important to control.

As one example of purification, the filtration step occurs at temperatures above the melting point of the wax composition and may optionally be ignited with an inert gas, for example but not limited to nitrogen, to reduce oxidation. Further, it shall be understood that in preferred aspects, the filtration takes place after the partial or full hydrogenation step; however, the filtration may also take place before the partial or full hydrogenation step.

Dissipation Factor

Aspects of the present invention include a method of using dissipation factor (as described herein, dissipation factor is measured at 70° C. using ASTM method D924-08) to control the purification of wax compositions to improve candle properties and improve the consistency of said candle properties. The method comprises purifying a modified natural oil and monitoring dissipation factor until a dissipation factor ranging from about 0.0001 to about of 0.0600 (measured at 70° C.) is achieved. Without being bound by any theory, monitoring dissipation factor within this range provides insight on the desirable elimination or control of impurities that impact the performance of a candle wax composition. Furthermore, dissipation factor effectively measures miniscule amounts of contaminants that impact candle wax performance below the detection limit of other common methods, e.g., gas chromatography (GC) and high pressure liquid chromatography (HPLC). Further, the removal of volatile impurities in the oil such as, for example, aldehydes, ketones and acids, which can contribute to odor, taste, color and significantly impact candle burn properties can be controlled via dissipation factor and perhaps other dielectric properties. Accordingly, once the desired dissipation range is achieved, it is an indication that desired wax composition has been achieved.

In some aspects, the method includes purifying a modified natural oil until a dissipation factor ranging from 0.00500 to 0.03000 is achieved. In other aspects, the method includes purifying a modified natural oil until a dissipation factor ranging from 0.0100 to 0.03000 is achieved. In yet other aspects, the method includes purifying a modified natural oil until a dissipation factor ranging from 0.0100 to 0.03000 is achieved. In yet other aspects, the method includes purifying a modified natural oil until a dissipation factor ranging from 0.0125 to 0.175 is achieved. It shall be understood that the desired dissipation factor can change depending on the type of natural oil.

It shall be understood that in some aspects, the wax composition may comprise nickel that can be difficult to remove, as such nickel is usually in solution or in a finely divided state. The nickel content may be as high as 50 ppm and sometimes up to 100 ppm in nickel. These residual traces of nickel often occur in the form of soap and/or as colloidal metal. For various reasons, i.e. to prevent oxidation, it is desirable for the nickel content of the modified natural oil to be low, often below 1 ppm nickel. Also, the presence of nickel in a modified natural oil can have an effect on the burn performance of a candle (soot, height, size, rate, carbon heading, etc.). In certain aspects, the presence of nickel may affect the coloration and/or burn performance of candles made from the wax composition described herein by causing wick clogging, irregular flames and/or flame heights, deleterious component (fragrance, surfactants, etc.), interactions, or combinations of these issues.

Accordingly, purifying until the desired dissipation factor is achieved in combination with monitoring nickel content and purifying the modified natural oil until both the desired dissipation factor is achieved and a nickel content less than 0.5 ppm, and in some aspects less than 0.2 ppm, and in some aspects less than 0.1 ppm, is achieved also provides improved rate of consumption and flame height properties for candle wax compositions.

Additionally, monitoring surface tension properties of the modified natural oil until both the desired dissipation factor is achieved and a surface tension value ranging from about 29 dynes/cm to about 30 dynes/cm (measured by ASTM D1331-14) is achieved also provides improved rate of consumption and flame height properties for candle wax composition. In other aspects, monitoring all three properties simultaneously—dissipation factor, nickel content, and surface tension—to achieve values within the articulated desired ranges for each property also provides improved burn performance, e.g., rate of consumption and flame height properties for candle wax compositions.

In some aspects, a near-infrared ("Near IR") spectroscopy method with a partially squares algorithm can be used to accelerate the testing and monitoring of dissipation factor during the purification process as it Near IR provides a rapid predication via correlation of prior Near IR and dissipation factor data (or other).

In the various aspects of purifying until the desired dissipation factor is achieved, purifying until both the desired dissipation factor and nickel content is achieved, purifying until the desired dissipation factor and surface tension is achieved, and purifying until the desired dissipation factor, surface tension, and nickel content is achieved, the rate of consumption ("ROC") ranges from about 3 to about 4 grams per hour of burn and in preferred aspects, from about 3.25 to about 3.75 grams per hour of burn. Furthermore, the aspects produce a candle wax composition having a flame height ranging from about 0.25 inches to about 1.5 inches, more preferably from about 0.5 inches to about 1.5 inches, and even more preferably from about 0.5 inches to about 1.25 inches.

Additives to the Wax Composition

In certain aspects, the wax composition may comprise at least one additive selected from the group consisting of: wax-fusion enhancing additives, coloring agents, surface tension modifiers, scenting agents, migration inhibitors, free fatty acids, surfactants, co-surfactants, emulsifiers, antioxidants, additional optimal wax ingredients, and combinations thereof. In certain aspects, the additive(s) may comprise upwards of approximately 30 percent by weight, upwards of approximately 5 percent by weight, or upwards of approximately 0.1 percent by weight of the wax composition.

In certain aspects, the wax composition can incorporate a wax-fusion enhancing type of additive selected from the group consisting of benzyl benzoate, dimethyl phthalate, dimethyl adipate, isobornyl acetate, cellulose acetate, glucose pentaacetate, pentaerythritol tetraacetate, trimethyl-s-trioxane, N-methylpyrrolidone, polyethylene glycols and mixtures thereof. In certain aspects, the wax composition comprises between approximately 0.1 percent by weight and approximately 5 percent by weight of a wax-fusion enhancing type of additive.

In certain aspects, one or more dyes or pigments (herein "coloring agents") may be added to the wax composition to provide the desired hue to the candle. In certain aspects, the wax composition comprises between about approximately 0.001 percent by weight and approximately 2 percent by weight of the coloring agent. If a pigment is employed for the coloring agent, it is typically an organic toner in the form of a fine powder suspended in a liquid medium, such as a mineral oil. It may be advantageous to use a pigment that is in the form of fine particles suspended in a natural oil, e.g., a vegetable oil such as palm or soybean oil. The pigment is typically a finely ground, organic toner so that the wick of a candle formed eventually from pigment-covered wax particles does not clog as the wax is burned. Pigments, even in finely ground toner forms, are generally in colloidal suspension in a carrier.

A variety of pigments and dyes suitable for candle making are listed in U.S. Pat. No. 4,614,625, the disclosure of which is herein incorporated by reference in its entirety. In certain aspects, the carrier for use with organic dyes is an organic solvent, such as a relatively low molecular weight, aromatic hydrocarbon solvent (e.g., toluene and xylene).

In other aspects, one or more perfumes, fragrances, essences, or other aromatic oils (herein "scenting agents") may be added to the wax composition to provide the desired odor to the wax composition. In certain aspects, the wax composition comprises between about approximately 1 percent by weight and approximately 15 percent by weight of the scenting agent. The coloring and scenting agents generally may also include liquid carriers that vary depending upon the type of color- or scent-imparting ingredient employed. In certain aspects, the use of liquid organic carriers with coloring and scenting agents is preferred because such carriers are compatible with petroleum-based waxes and related organic materials. As a result, such coloring and scenting agents tend to be readily absorbed into the wax composition material.

In certain aspects, the scenting agent may be an air freshener, an insect repellent, or mixture thereof. In certain aspects, the air freshener scenting agent is a liquid fragrance comprising one or more volatile organic compounds, including those commercially available from perfumery suppliers such as: IFF, Firmenich Inc., Takasago Inc., Belmay, Symrise Inc, Noville Inc., Quest Co., and Givaudan-Roure Corp. Most conventional fragrance materials are volatile essential oils. The fragrance can be a synthetically formed material, or a naturally derived oil such as oil of bergamot, bitter orange, lemon, mandarin, caraway, cedar leaf, clove leaf, cedar wood, geranium, lavender, orange, origanum, petitgrain, white cedar, patchouli, lavandin, neroli, rose, and the like.

In other aspects, the scenting agent may be selected from a wide variety of chemicals such as aldehydes, ketones, esters, alcohols, terpenes, and the like. The scenting agent can be relatively simple in composition, or can be a complex mixture of natural and synthetic chemical components. A typical scented oil can comprise woody/earthy bases containing exotic constituents such as sandalwood oil, civet, patchouli oil, and the like. A scented oil can have a light floral fragrance, such as rose extract or violet extract. Scented oil also can be formulated to provide desirable fruity odors, such as lime, lemon, or orange.

In yet other aspects, the scenting agent can comprise a synthetic type of fragrance composition either alone or in combination with natural oils such as described in U.S. Pat. Nos. 4,314,915; 4,411,829; and 4,434,306; incorporated herein by reference in their entirety. Other artificial liquid fragrances include geraniol, geranyl acetate, eugenol, isoeugenol, linalool, linalyl acetate, phenethyl alcohol, methyl ethyl ketone, methylionone, isobornyl acetate, and the like. The scenting agent can also be a liquid formulation containing an insect repellent such as citronellal, or a therapeutic agent such as *eucalyptus* or menthol.

In certain aspects, a "migration inhibitor" additive may be included in the wax composition to decrease the tendency of colorants, fragrance components, and/or other components of the wax from migrating to the outer surface of a candle. In certain aspects, the migration inhibitor is a polymerized alpha olefin. In certain aspects, the polymerized alpha olefin has at least 10 carbon atoms. In another aspect, the polymerized alpha olefin has between 10 and 25 carbon atoms. One suitable example of such a polymer is a hyper-branched alpha olefin polymer sold under the trade name Vybar® 103 polymer (mp 168.degree. F. (circa 76.degree. C.); commercially available from Baker-Petrolite, Sugarland, Tex., USA).

In certain aspects, the inclusion of sorbitan triesters, such as sorbitan tristearate and/or sorbitan tripalmitate, and related sorbitan triesters formed from mixtures of fully hydrogenated fatty acids, and/or polysorbate triesters or monoesters such as polysorbate tristearate and/or polysorbate tripalmitate and related polysorbates formed from mixtures of fully hydrogenated fatty acids and/or polysorbate monostearate and/or polysorbate monopalmitate and related polysorbates formed from mixtures of fully hydrogenated fatty acids in the wax composition may also decrease the propensity of colorants, fragrance components, and/or other components of the wax from migrating to the candle surface. The inclusion of either of these types of migration inhibitors can also enhance the flexibility of the wax composition and decrease its chances of cracking during the cooling processes that occur in candle formation and after extinguishing the flame of a burning candle.

In certain aspects, the wax composition may include between approximately 0.1 percent by weight and approximately 5.0 percent by weight of a migration inhibitor (such as a polymerized alpha olefin). In another aspect, the wax composition may include between approximately 0.1 percent by weight and approximately 2.0 percent by weight of a migration inhibitor.

In another aspect, the wax composition may include an additional optimal wax ingredient, including without limitation, creature waxes such as beeswax, lanolin, shellac wax, Chinese insect wax, and spermaceti, various types of plant waxes such as carnauba, candelila, Japan wax, ouricury wax, rice-bran wax, jojoba wax, castor wax, bayberry wax, sugar cane wax, and maize wax), and synthetic waxes such as polyethylene wax, Fischer-Tropsch wax, chlorinated naphthalene wax, chemically modified wax, substituted amide wax, montan wax, alpha olefins and polymerized alpha olefin wax. In certain aspects, the wax composition may include upward of approximately 25 percent by weight, upward of approximately 10 percent by weight, or upward of approximately 1 percent by weight of the additional optimal wax ingredient.

In certain aspects, the wax composition may include a surfactant. In certain aspects, the wax composition may include upward of approximately 25 percent by weight of a surfactant, upward of approximately 10 percent by weight, or upward of approximately 1 percent by weight of a surfactant. A non-limiting listing of surfactants includes: silanes, siloxanes, polyether siloxane, alkyl siloxanes, polyoxyethylene sorbitan trioleate, such as Tween 85, commercially available from Acros Organics; polyoxyethylene sorbitan monooleate, such as Tween 80, commercially available from Acros Organics and Uniqema; sorbitan tristearate, such as DurTan 65, commercially available from Loders Croklann, Grindsted STS 30 K commercially available from Danisco, and Tween 65 commercially available from Acros Organics and Uniqema; sorbitan monostearate, such as Tween 60 commercially available from Acros Organics and Uniqema, DurTan 60 commercially available from Loders Croklann, and Grindsted SMS, commercially available from Danisco; Polyoxyehtylene sorbitan monopalmitate, such as Tween 40, commercially available from Acros Organics and Uniqema; and polyoxyethylene sorbitan monolaurate, such as Tween 20, commercially available from Acros Organics and Uniqema.

In additional aspects, an additional surfactant (i.e., a "co-surfactant") may be added in order to improve the microstructure (texture) and/or stability (shelf life) of emulsified wax compositions. In certain aspects, the wax composition may include upward of approximately 5 percent by weight of a co-surfactant. In another aspect, the wax composition may include upward of approximately 0.1 percent by weight of a co-surfactant.

It shall be understood that dissipation factor can be used to control the manufacture of the candle wax composition, as described above, and/or the entire candle formulation.

EXAMPLES

All samples were prepared and run following ASTM method D924-08, Dissipation Factor and Relative Permittivity of Electrical Insulating Liquids (note that IEC 60247 is an alternative method to determine dissipation factor).

The instrument used to measure dissipation factor was manufactured by Eltel: comprising of a main unit, product code ADTR-2K Plus and an automatic oil cell heater, product code AOCH-06. The individual oil cell was maintained throughout all measurements to reduce systematic error. The oil cell comprises 6 separate components.

The dielectric cell was thoroughly cleaned using acetone and, if particularly soiled, toluene or isopropanol. Upon melting of wax sample, approximately 30-40 ml of molten wax was poured into the vessel and placed into the cell heater. The inside unit of the oil cell was rinsed with acetone prior to being placed inside the vessel filled with sample. The sample level was consistently above the point where the bottom and top of the internal cell meet, but below the larger "O-ring". The oil cell is connected with a thermocouple and an electric supply through 3 cords: 1 High Voltage, 1 Ground, and 1 Low Voltage. Specific assembly of the vessel into the automatic cell heater is further outlined in the Eltel user manual. Once set-up, the dissipation was measured at 70° C.

Example #1

Molten samples of fully hydrogenated palm (Master Chef Stable Flake P), NatureWax C-1, and partially hydrogenated Soybean oil (NatureWax S-113) were measured for dissipation factor via ASTM method D924-08 and compared to the Rate of Consumption (ROC). Refer to FIGS. 1-4 for a comparison of ROC against dissipation factor measured at 70 C.

Example #2

Dissipation factor was measured, following ASTM method D924-08, on a sample of NatureWax C-1 with a low ROC. This sample was then heated to 80° C. and 0.5% of a Bleaching Clay (Supreme P6000) was added to the wax and agitated for 15 minutes. After the 15 minutes of agitation the bleach clay was filtered from the wax. The sample was re-analyzed for ROC and Dissipation. The dissipation factor was noted to have gone down and the ROC was noted to have gone up to an acceptable range. Linear fit is derived from data in example #1. Refer to FIGS. 1-4 for a comparison of ROC against dissipation factor measured at 70 C.

Example #3

Figure 1:
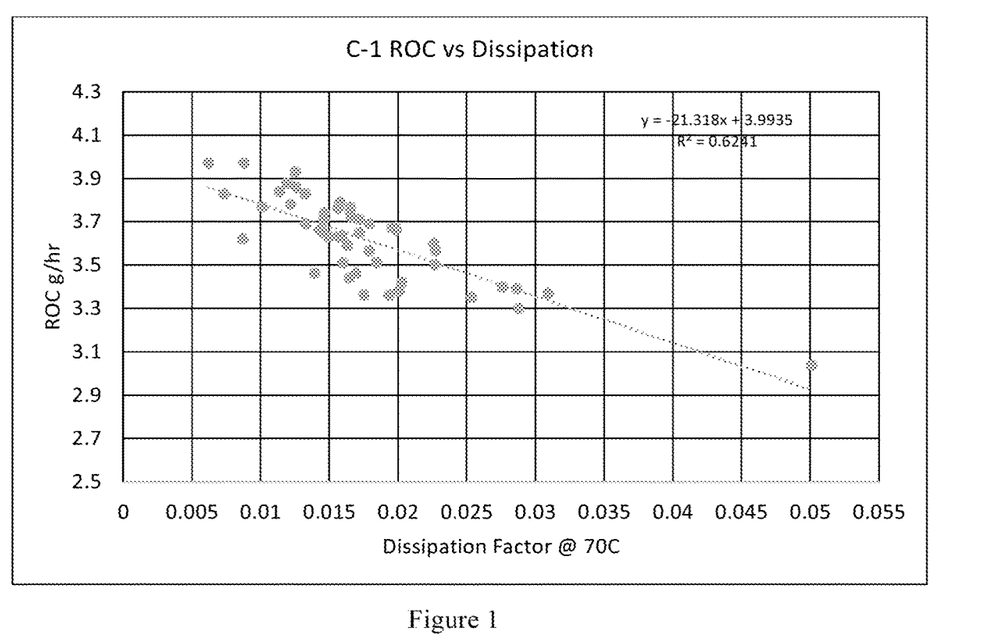
FIGS. 1, 4, & 5 shows the relationship between dissipation factor and rate of consumption for a standard candle wax formulation that is commercially available from Cargill, Incorporated.
Figure 2:
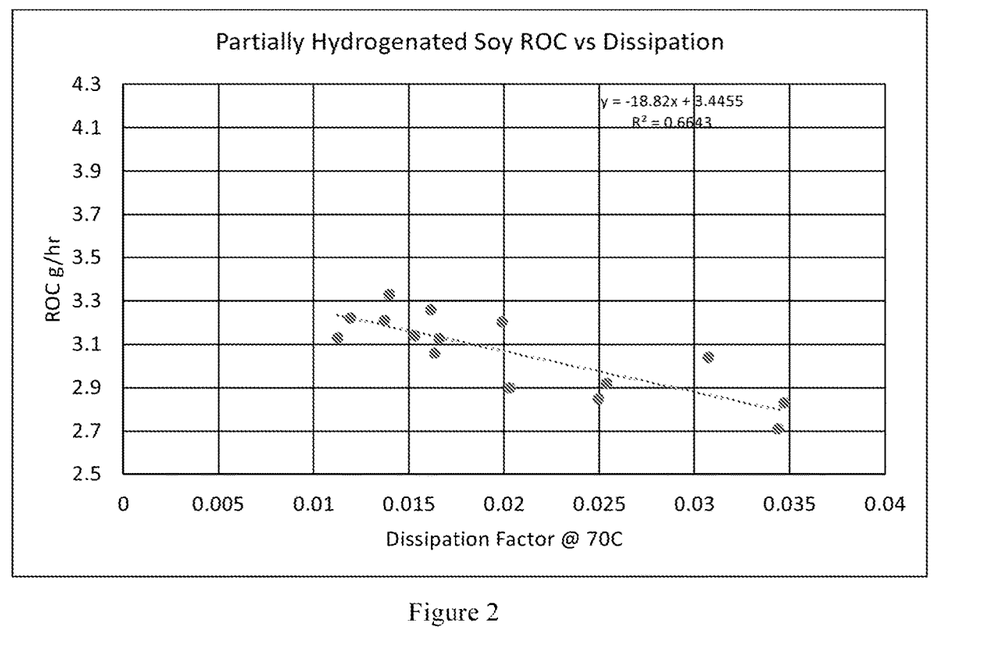
FIG. 2 shows the relationship between dissipation factor and rate of consumption for a partially hydrogenated soy oil sample.
Figure 3:
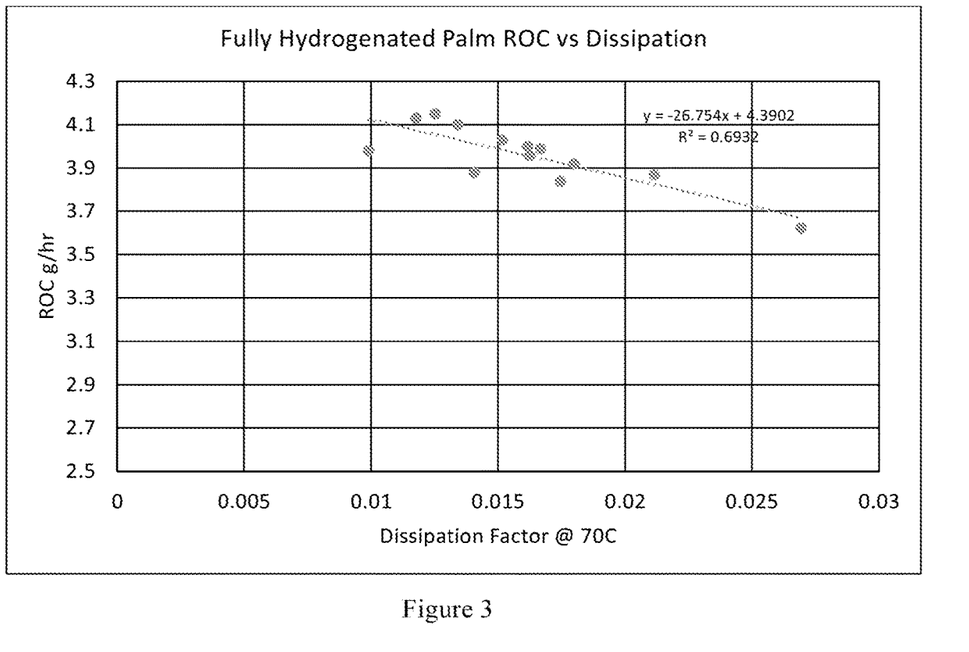
FIG. 3 shows the relationship between dissipation factor and rate of consumption for a fully hydrogenated palm oil sample.
Figure 4:
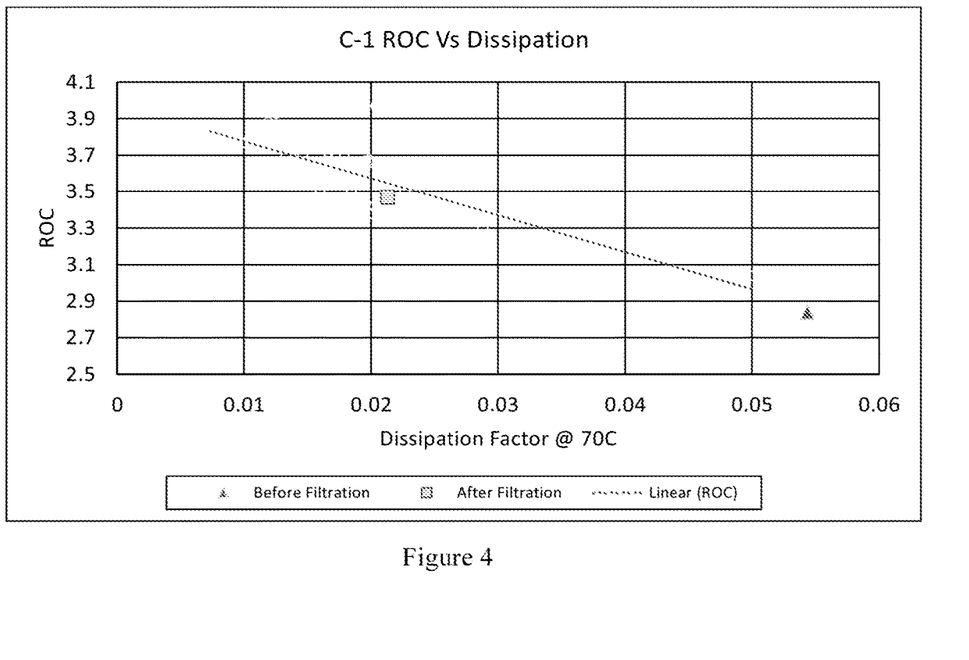
Figure 5:
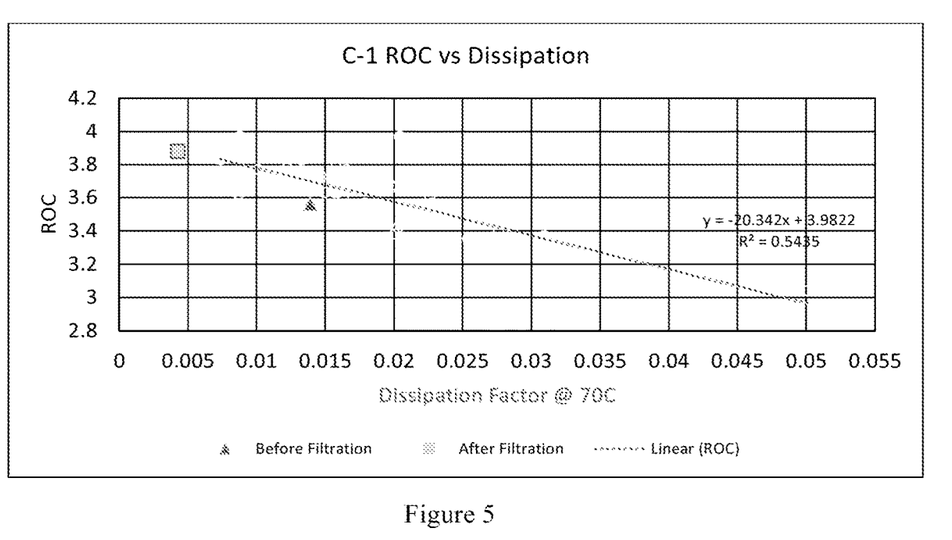

Dissipation factor was measured, following ASTM method D924-08, on a sample of NatureWax C-1 with an average ROC. This sample was then heated to 80° C. and 0.5% of a Bleaching Clay (Select FF) was added to the wax and agitated for 15 minutes. After the 15 minutes of agitation the bleaching clay was filtered out of the wax. The sample was re-analyzed for ROC and Dissipation. The dissipation factor decreased and the ROC increased to a level that may fall outside of certain candle wax specifications. Linear fit is derived from C-1 data in example #1. Refer to FIG. 5 for a comparison of ROC against dissipation factor measured at 70 C.

The invention claimed is:

1. A method of making a candle wax composition, the method comprising:
    purifying a modified natural oil to provide a candle wax composition, the purifying comprising
        combining the modified natural oil with bleaching clay to form a mixture,
        filtering the mixture to remove the bleaching clay from the modified natural oil,
        monitoring the dissipation factor of the candle wax composition,
        if the dissipation factor is outside of the range of from 0.001-0.0600, then further performing the purifying, and
        if the dissipation factor is in the range of from 0.001-0.0600, then providing the candle wax composition;
    wherein the candle wax composition has an increased rate of consumption compared to the modified natural oil.

2. The method of claim 1, wherein the dissipation factor ranges from 0.0100-0.0300.

3. The method of claim 1, wherein the candle wax composition has a nickel content less than 0.5 ppm.

4. The method of claim 1, wherein the candle wax composition has a nickel content less than 0.2 ppm.

5. The method of claim 1, wherein the candle wax composition has a nickel content less than 0.1 ppm.

6. The method of claim 1, wherein the natural oil is selected from the group consisting of canola oil, rapeseed oil, coconut oil, corn oil, cottonseed oil, olive oil, palm oil, peanut oil, safflower oil, sesame oil, soybean oil, sunflower oil, linseed oil, palm kernel oil, tung oil, jatropha oil, mustard oil, camelina oil, pennycress oil, castor oil, or mixtures thereof.

7. The method of claim 1, wherein the modified natural oil is partially hydrogenated soybean oil.

8. The method of claim 1, wherein the modified natural oil is hydrogenated palm oil.

9. The method of claim 1, wherein the modified natural oil is a blend of partially hydrogenated soybean oil and hydrogenated palm oil.

10. The method of claim 9, wherein the blend comprises about 70-90 wt % partially hydrogenated soybean oil and a remaining balance of hydrogenated palm oil.

11. The method of claim 1, comprising purifying a blend of the modified natural oil and paraffin, wherein paraffin is present in a majority amount.

12. The method of claim 1 wherein the candle wax composition comprises a combination of MAGs, DAGs, and TAGs.

13. The method of claim 1 wherein the candle wax composition comprises at least one of MAGs, DAGs, and TAGs.

14. The method of claim 1, further comprising
    monitoring the dissipation factor of the candle wax composition; and
    if the dissipation factor is outside of the range of from 0.005-0.0300, then further performing the purifying; and
    if the dissipation factor is in the range of from 0.005-0.0300, then providing the candle wax composition.

* * * * *